(12) United States Patent
Weber et al.

(10) Patent No.: US 8,171,490 B2
(45) Date of Patent: *May 1, 2012

(54) METHOD, APPARATUS, AND COMPUTER PROGRAM PRODUCT FOR DEFERRED COMPLETION OF MULTI-STEP USER TRANSACTION APPLICATIONS

(75) Inventors: Jay C. Weber, Menlo Park, CA (US); Todd Lash, Oakland, CA (US); Suzanne Stefanac, San Francisco, CA (US)

(73) Assignee: Rehle Visual Communications LLC, Las Vegas, NV (US)

( * ) Notice: Subject to any disclaimer, the term of this patent is extended or adjusted under 35 U.S.C. 154(b) by 1082 days.

This patent is subject to a terminal disclaimer.

(21) Appl. No.: 11/264,456

(22) Filed: Nov. 1, 2005

(65) Prior Publication Data

US 2006/0080601 A1    Apr. 13, 2006

Related U.S. Application Data

(63) Continuation of application No. 09/364,170, filed on Jul. 29, 1999, now Pat. No. 6,971,105.

(51) Int. Cl.
*G06F 3/00* (2006.01)
*G06F 7/00* (2006.01)

(52) U.S. Cl. .................... 719/310; 707/703
(58) Field of Classification Search ................ 719/310; 705/80; 707/1
See application file for complete search history.

(56) References Cited

U.S. PATENT DOCUMENTS

| | | | |
|---|---|---|---|
| 5,367,624 A * | 11/1994 | Cooper | 715/734 |
| 5,732,219 A | 3/1998 | Blumer et al. | |
| 5,745,681 A * | 4/1998 | Levine et al. | 709/200 |
| 5,835,717 A | 11/1998 | Karlton et al. | |
| 5,835,920 A | 11/1998 | Horton | |
| 5,920,696 A | 7/1999 | Brandt et al. | |
| 5,956,709 A * | 9/1999 | Xue | 707/3 |
| 6,004,276 A * | 12/1999 | Wright et al. | 600/508 |
| 6,018,749 A | 1/2000 | Rivette et al. | |
| 6,125,388 A | 9/2000 | Reisman | |
| 6,128,667 A * | 10/2000 | Jeffrey | 709/245 |

(Continued)

FOREIGN PATENT DOCUMENTS

EP  0844767  5/1998

(Continued)

OTHER PUBLICATIONS

Alberto R. Cunha, The Architecture of a Memory Management Unit for Object-Oriented Systems, 1991.*

(Continued)

*Primary Examiner* — Lechi Truong

(57) ABSTRACT

Disclosed are server features for allowing a client user to defer completion of multi-step user transaction applications ("MUTAs") and later resume the MUTA. One disclosed feature is providing a selectable deferral action in a page implementing part of the MUTA, e.g., HTML, XML, JavaScript/ECMA Script document. If the client user selects to defer completion, a state object is created by the server and stores state information including information previously entered during the MUTA. The server provides a resumption object to the user including a resource for resuming the deferred MUTA. When the user selects the resource, state information stored in the state object is loaded and the use may complete the remainder of the MUTA. An additionally disclosed aspect is automatic state saving where sate information is stored automatically during multiple steps in the MUTA; the user then need not select deferral.

21 Claims, 8 Drawing Sheets

U.S. PATENT DOCUMENTS

| | | | | |
|---|---|---|---|---|
| 6,167,523 | A | 12/2000 | Strong | |
| 6,199,079 | B1 | 3/2001 | Gupta et al. | |
| 6,219,711 | B1 | 4/2001 | Chari | |
| 6,311,269 | B2* | 10/2001 | Luckenbaugh et al. | 713/154 |
| 6,313,835 | B1 | 11/2001 | Gever et al. | |
| 6,330,586 | B1* | 12/2001 | Yates et al. | 709/201 |
| 6,345,278 | B1 | 2/2002 | Hitchcock et al. | |
| 6,347,943 | B1 | 2/2002 | Fields et al. | |
| 6,360,266 | B1 | 3/2002 | Pettus | |
| 6,971,105 | B1 | 11/2005 | Weber et al. | |
| 7,257,604 | B1* | 8/2007 | Wolfe | 1/1 |
| 7,302,402 | B2 | 11/2007 | Callaghan et al. | |
| 7,500,178 | B1 | 3/2009 | O'Donnell | |
| 7,543,228 | B2 | 6/2009 | Kelkar et al. | |

FOREIGN PATENT DOCUMENTS

| | | |
|---|---|---|
| WO | 9913424 | 3/1999 |
| WO | 99/23558 | 5/1999 |
| WO | 0109714 | 2/2001 |
| WO | 0109766 | 2/2001 |

OTHER PUBLICATIONS

Callangha et al, "Method, System and Program Product for Sharing State Information Across Domains"; Mar. 30, 1998.

Szmurlo, M. et al., "A Network of Asynchronous Micro-servers as a Framework for Server Development", Computer Networks and ISDN Systems, vol. 29, No. 8-13, pp. 1041-1051 (Sep. 1997).

Lameter, C., et al., "lftp—Sophisticated ftp program" Internet Document: LFTP Manpage, .dca.fee.unicamp.br/cgi-bin/man2ntml/n/net/man/man1/1ftp.1: p. 1, (Jan. 18, 2001).

Peterson, J., "The ASP 101 Discussion Forum" Internet Document, "Online!", Jan. 26, 1999, pp. aspforum.sub.—1. asp—aspforum.sub.—4.asp, XP002160642m .asp101.com/resources.

Betz, M., "Active Data Object & ASP", Dr. Dobb's Journal, May 1998, pp. 88-91-111-112.

Anonymous, "Active Server Pages . . . " Internet Document, "Online!" XP002160643 .4guysfromrolla.com/webtech/ASP.sub.—index.sub.—99.shtml, 92-15-01).

Kristol, D. and Montulli, L., "XP-002179651, HTTP State Management Mechanism", Feb. 1997, 14 pages.

International Search Report, International Application No. PCT/US00/19552, Jan. 19, 2001, 3 pages.

Official Action in European Patent Application No. 00 952 156.8—2201, Jan. 9, 2009.

Georg Jacoby and Kristina Emander, "Minutes of Oral Proceedings", European Application No. 00 952 156.8—2201, Mar. 26, 2009, 56 pages.

Official Action in European Application No. 00952156.8 dated Oct. 14, 2004, 5 pages.

Response to Official Action in European Application No. 00952156.8 dated Oct. 14, 2004, mailed Apr. 19, 2005, 20 pages.

International Search Report for Application No. PCT/US00/19553 dated Jan. 3, 2001.

Lindberg, Steve, "Form Validation with ASP . . . Help!", microsoft.public.inetserver.iss.activeserverpages newsgroup, Nov. 4, 1998, 2 pages.

Summons to attend oral proceedings in European Application No. 00952156.8 dated Dec. 19, 2008, 6 pages.

Amended claims in European Application No. 00952156.8 dated Feb. 10, 2009, 29 pages.

Andrew S. Tanenbaum, "Computer-Netzwerke," 1990, Wolfram's Fachverlag, Germany ISBN: 3-925328-79-3, section 6.2.3, pp. 478-483.

Fred Halsall, "Data communications, computer networks and open systems," 1992, Addison-Wesley Publishing Company, USA ISBN:0-201-56506-4, sections 10.6.2 and 11.2, pp. 533-534, 567-568.

Grounds of Appeal for European Application No. 00952156.8 dated Aug. 5, 2009, 14 pages.

* cited by examiner

Shipment Address                    ┌─5100

Shipment Postal Code
                                    └─5200

Shipment Method    ○ Overnight Delivery
                   ○ 2-Day Priority
            5300   ○ Standard Delivery ┌─5400
Submit    Clear    Defer

*FIG. 5*

METHOD, APPARATUS, AND COMPUTER PROGRAM PRODUCT FOR DEFERRED COMPLETION OF MULTI-STEP USER TRANSACTION APPLICATIONS

This application is a continuation of U.S. patent application Ser. No. 09/364,170, entitled "A Method, Apparatus, and Computer Program Product for Deferred Completion of Multi-Step User Transaction Applications", filed Jul. 29, 1999, now U.S. Pat. No. 6,971,105.

RELATED APPLICATION

Subject matter in this application may be used in conjunction with subject matter described in a commonly owned patent application entitled "Method, Apparatus, and Computer Program Product For Automatic Page Suppression in Forms" naming Jay C. Weber and Caius van Nouhuys as inventors, which was filed on Jul. 29, 1999 and assigned application Ser. No. 09/363,978 (now U.S. Pat. No. 6,701,486), and which is incorporated herein in its entirety by this reference.

FIELD

Aspects of the invention relate generally to server architectures for transaction processing and more particularly to architectures with features allowing user control over the timing of the completion portion of transaction processing.

BACKGROUND

The collection of protocols and applications commonly referred to as the World Wide Web ("Web") is a widely used client-server architecture for transaction applications. The convenience of carrying on transactions with Web applications is leading to an increasing portion of the transactions persons engage in day-to-day being performed with Web applications.

Typically, transaction applications involve many steps each with its own page. The network user generally must interact must with each page of the transaction application. When such a multi-step user transaction application (hereinafter "MUTA") is started by the user, they may not have expected the MUTA to require as many steps as it does, or some other activity may interrupt the user's ability to complete the MUTA at the current time. This is particularly true with increasingly popular platforms where, for instance, Web applications, are combined with televised entertainment. Such platforms are frequently known as "Enhanced TV" or "Interactive TV" (hereinafter "ITV"). In such a context, a viewer of a video program may be prompted by a Web resource enhancing the video program to initiate a transaction. However, the user may wish to return to viewing the video program quickly and not wish to spend the time to complete the transaction at that moment. Thus it would be desirable for a mechanism to exist that allowed the user to defer completion of such a transaction.

Related series of technologies include user registration systems. In a typical user registration system, a user provides information to the operator of, for instance, a Web application. The user may be able to pre-specify information that is relevant to a later interaction during the registration process. However, the registration information that is stored cannot provide information that would allow a user to return to the precise position in a later-initiated transaction where the user decided to defer completion. Put another way, while user data stored, for instance as part of a registration process, may be relevant to a later transaction and form part of the state of the transaction at any particular step, user registration data does not provide full state information for later-initiated transactions. Accordingly, stored registration data technologies are unable to provide a system for preserving state of a MUTA to allow deferred completion and resumption.

An additional aspect of conventional technologies is that conventional Web applications lack a convenient mechanism to defer completion at any point of a transaction. Many conventional electronic commerce applications operate on a 'shopping cart' model. In a typical 'shopping cart' model application, a user will interact with an 'electronic store' of some sort: browsing items, comparing product features, searching, etc., and then add items the user wishes to purchase to an electronic 'shopping cart' . When the user wishes to complete their interaction at the 'electronic store,' the user so indicates and the items 'in' their 'shopping cart' are processed to consummate the transaction. Many 'shopping cart' applications provide the feature that a user can return to their 'shopping cart' with the state preserved, i.e., the items they have previously 'in' their 'shopping cart' will still be there. However, the 'shopping cart' is but one part in an overall shopping application: users do not have the ability to return directly to other points in the overall process, for example a particular page providing information about a product's features. As the type and nature of Web transactions becomes more complex, and as less sophisticated users carry on such transactions, a need has arisen for a general solution to the problem of allowing a user to defer completion of MUTAs at any step in the overall interaction and resume the interaction at that stage at a later time.

SUMMARY

In order to provide a solution to the forgoing and additional problems, aspects of our invention provide a method, apparatus, and computer program product for deferred completion of multi-step user transaction applications.

One aspect of the invention involve computer-implemented methods for deferring completion of a multi-step user transaction application. An illustrative method includes providing a page to a client application. The page includes one or more resources for input of information related to completion of the MUTA, and a resource for selection of a deferral action. The method also includes receiving an indication of the selection of the deferral action, storing state information (including a position in the MUTA and information related to completion of the MUTA); and generating a resumption object including an identifier of a resource for completion of the MUTA. Storing state information can be performed automatically at more than one step in the MUTA and storing state information can be performed in response to user selection. In addition storing state information may include monitoring an elapsed time since a transaction page was provided; determining whether the elapsed time exceeds a predetermined time limit; and storing state information if a user response is received within the predetermined time limit. In an further step, the resumption object is transmitted to a client application.

An additional variation of the illustrative method includes a computer-implemented method for completing a previously-deferred MUTA. The computer-implemented method includes providing a resumption object to a client application. The resumption object here includes an identifier of a resource for completion of the MUTA. Additional steps in the method include receiving a request for the resource for completion of the MUTA; retrieving previously-received information for returning to a state at which the MUTA was previously deferred; and providing a resource corresponding to the state at which the MUTA was previously deferred.

Yet another aspect of the present invention are computing apparatuses for deferring completion of a multi-step user transaction application. An illustrative computing apparatus with a processor, a memory, and an input/output system includes server process logic configured for providing a page to a client application, the page including one or more resources for input of information related to completion of the MUTA and a resource for selection of a deferral action. The server process logic is further configured for receiving an indication of the selection of the deferral action, and generating a resumption object comprising an identifier of a resource for completion of the MUTA. The computing apparatus also includes a data storage system configured for storing state information including a position in the MUTA, and information related to completion of the MUTA. In a variation, the server process logic is configured for storing state information in the data storage system at plural steps in the MUTA; and, the illustrative apparatus may inclde process logic configured for monitoring an elapsed time since a transaction page was provided. In yet another component, the server process logic is further configured for transmitting the resumption object to a client application.

An additional variation of the illustrative apparatus includes a data storage system configured for storing a state object and server process logic configured for providing a resumption object to a client application. The resumption object includes an identifier of a resource for completion of the MUTA. The server process logic is also configured to receive a request for the resource for completion of the MUTA, retrieve previously-received information from the state object for returning to a state at which the MUTA was previously deferred, and provide a resource corresponding to the state at which the MUTA was previously deferred.

Yet another aspect of the invention are computer program products including a computer-readable storage medium having computer-readable program code embodied therein for deferring completion of a multi-step user transaction application. Illustrative computer-readable program code includes code for providing a page to a client application. The page includes one or more resources for input of information related to completion of the MUTA, and a resource for selection of a deferral action. The computer-readable program code also includes code for receiving an indication of the selection of the deferral action, code for storing state information (including a position in the MUTA and information related to completion of the MUTA), and code for generating a resumption object comprising an identifier of a resource for completion of the MUTA. The code for storing state information may also include code for storing state information and two or more steps in the MUTA. The code for storing state information may include code for monitoring an elapsed time since a transaction page was provided; code for determining whether the elapsed time exceeds a predetermined time limit; and code for storing state information if a user response is received within the predetermined time limit.

An additional variation on the illustrative program product includes a computer-readable medium having computer program code embodied therein, the computer program code including code for providing a resumption object to a client application. The resumption object includes an identifier of a resource for completion of the MUTA. The computer program also includes code for receiving a request for said resource for completion of the MUTA, code for retrieving previously-received information for returning to a state at which the MUTA was previously deferred; and code for providing a resource corresponding to said state at which the MUTA was previously deferred.

BRIEF DESCRIPTION OF THE DRAWINGS

These and other features, aspects, and advantages of the present invention will become better understood with regard to the following description, appended claims, and accompanying drawings where:

FIG. 5 depicts a rendered screen display of a step in an illustrative MUTA;

DETAILED DESCRIPTION

Description of Figures

Figure 1:
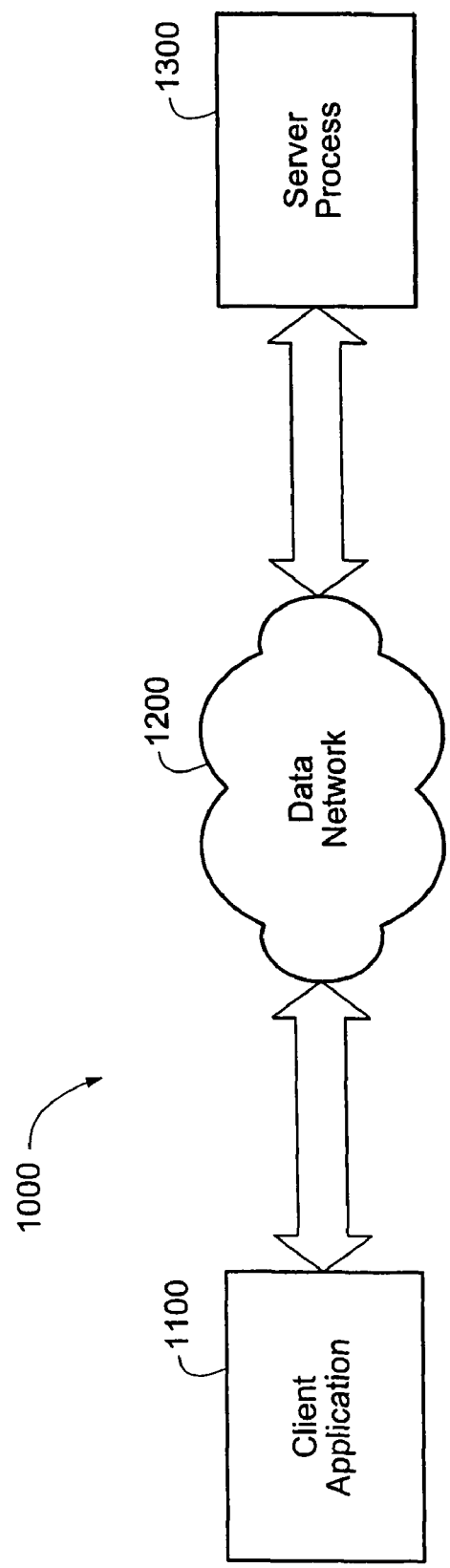
FIG. 1 is a diagram of elements in an operating environment in which an illustrative embodiment can be employed.

FIG. 1 depicts elements in an operating environment 1000 in accordance with an illustrative embodiment. Shown are a client application 1100 and a server process 1300. The client application 1100 and the server process 1300 are configured for client-server communication across a data network 1200. In some embodiments, the data network 1200 comprises a portion of the Internet, although other networks could be used, either public or private, and using either the TCP/IP protocols (including the User Datagram Protocol) or with other protocols. In preferred embodiments the Hypertext Transfer Protocol ("HTTP") is used to communicate Request and Response messages and Hypertext Markup Language ("HTML") pages.

In some embodiments, the client application 1100 executes on a hardware platform that integrates the features of a television receiver and network connectivity. Many commercially available structures can perform these functions. Certain of the current generation of "set-top boxes" are suitable, including, for instance, the WebTV "Plus" set-top box (also known as an Internet Receiver available through Microsoft's WebTV Networks, Inc. of Palo Alto, Calif. (and their manufacturing licensees). In other embodiments, the client application could execute on a general purpose computer configured with suitable video hardware to integrate the features of a television receiver and network connectivity. As one skilled in the art will appreciate from this disclosure, the features of the invention are not limited to embodiments which operate with client platforms that integrate television and network connectivity. However, the features of the invention obtain particular benefits in this context.

Figure 2:
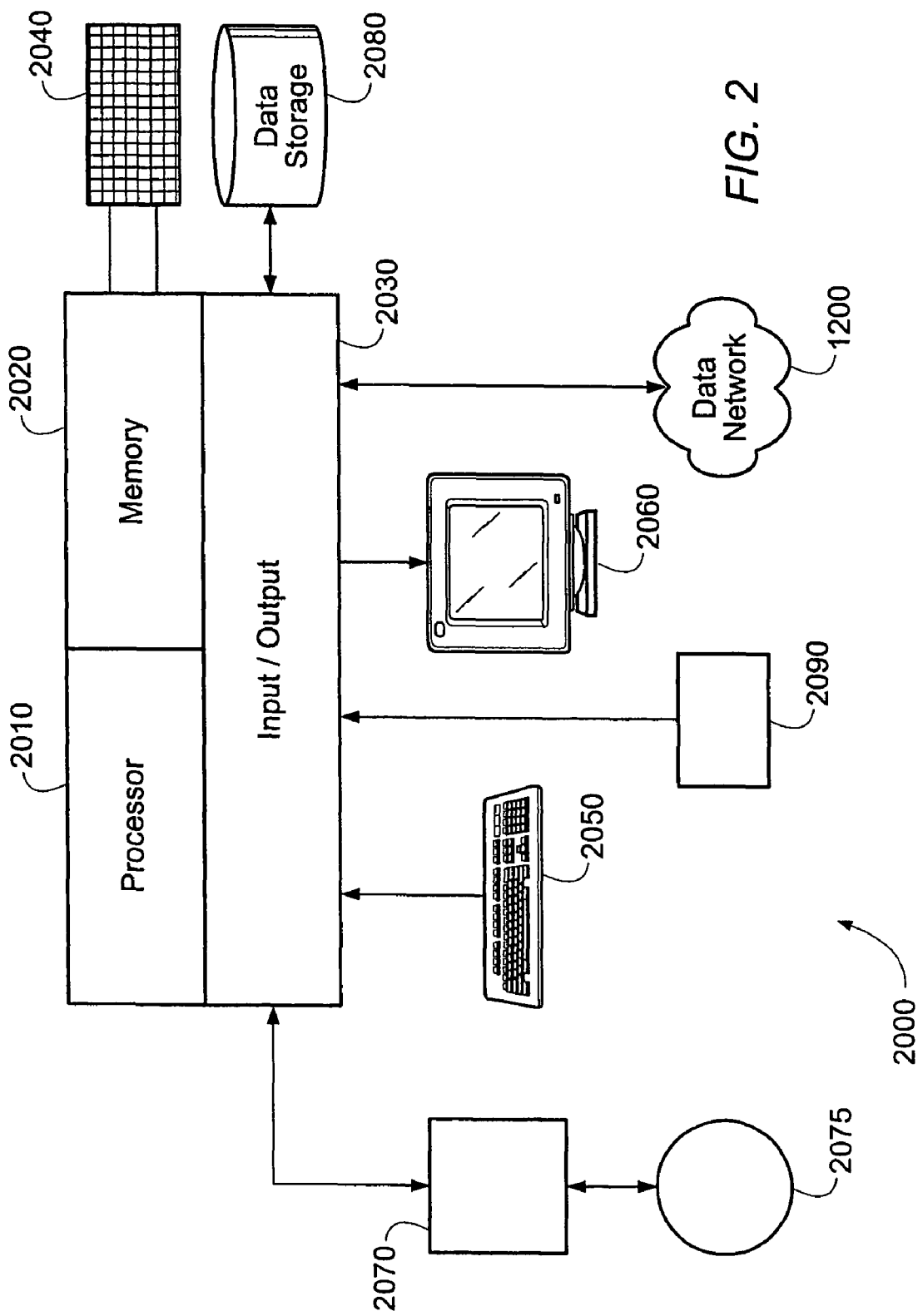
FIG. 2 depicts a computer system capable of being configured to embody aspects of the invention in accordance with an illustrative embodiment.

FIG. 2 depicts a computer system 2000 capable of embodying aspects of the invention. The server process 1300 may execute on structures in accordance with the computer system 2000. The computer system 2000 comprises a microprocessor 2010, a memory 2020 and an input/output system 2030. The memory 2020 is capable of being configured to provide a data structure 2040 which may contain data manipulated by the computer system 2000 when embodying aspects of the invention. Further illustrated is a media drive 2070, such as a disk drive, CD-ROM drive, or the like. The media drive 2070 may operate with a computer-usable storage medium 2075 capable of storing computer-readable program code ("code") able to configure the computer system 2000 to embody aspects of the invention. The input/output system 2030 may also operate with a keyboard 2050, a display 2060, a pointing device 2090, or a network such as the data network 1200. The input/output system 2030 may also communicate with a mass data storage 2080 such as a database or the like. The mass data storage 2080 may store information related to users of the client application 1100 that facilitate completion of MUTA, including, for instance, user profile information, records of past interactions, payment instrument information, demographic information, product or service feature preference information, or the like.

As illustrated, the computer system 2000 is general-purpose computing machinery. As one of skill recognizes, programmed instructions may configure general purpose computing machinery to embody structures capable of performing functions in accordance with aspects of the invention. Special purpose computing machinery comprising, for example, an application specific integrated circuit (ASIC) may also be used. In addition, the computer system 2000 could be diskless and operate with a non-volatile memory. Further, configurable hardware could be used including, for instance, a field programmable gate array, or a complex programmable logic device. One skilled in the art will recognize, numerous structures of programmed or programmable logic capable of being configured to embody aspects of the invention. In some embodiments, the computer system 2000 is a SPARC-based workstation from Sun Microsystems of Mountain View, Calif., running the SOLARIS operating system and the Apache HTTP server with a Secure Sockets Layer module. In such embodiments, the server process 1300 could comprise the Apache HTTP server with the Secure Sockets Layer module.

The client application 1100 (under the direction of a user) may communicate with the server process 1300 to carry out a MUTA. The user transaction application may be a commercial transaction (sometimes referred to as "E-Commerce"), although one skilled in the art is familiar with many other user transaction applications conventionally practiced in, for instance the Internet environment.

Typically MUTAs involve many steps, each with its own page(s). The user may not have expected so many steps when initiating the MUTA, or some other activity may interrupt the user's ability to complete the application at the current time. This is particularly true of ITV combinations of World Wide Web applications and televised entertainment where the user may wish to return to watching television full-screen before the interactive aspects of the application are completed.

Figure 3:
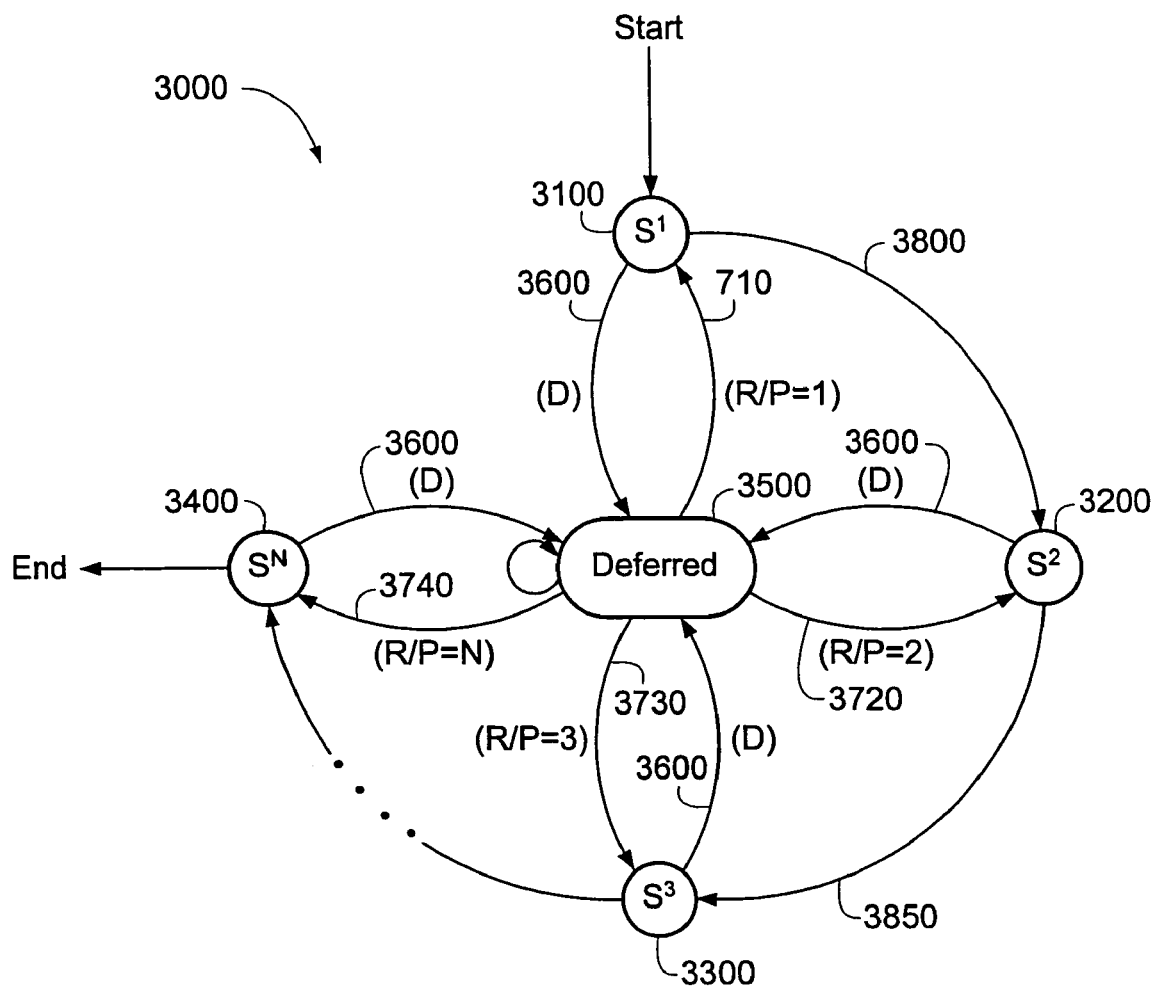
FIG. 3 is a state diagram showing deferred completion of a MUTA in accordance with an illustrative embodiment.

FIG. 3 depicts a deferred completion state diagram 3000 illustrative of various embodiments of the invention. The deferred completion state diagram 3000 is a high level representation of the context in which features of the invention may be advantageously employed. As depicted in FIG. 3, states and transitions of a MUTA are shown. When a user initiates the MUTA a first state 3100 is entered. The first state 3100 may be understood on differing levels of generality, from the first page provided from the server process 1300 to the client application 1100, to greater levels of generality including parameters relevant to the MUTA and/or their values. Without deferral, the MUTA proceeds though a first to second state transition 3800 to a second state 3200, though a second to third state transition 3850 to a third state 3300, etc. until a last or Nth state 3400 is entered and the MUTA completes. For similar transactions, one ordinarily expects the number of pages of forms in a transaction to be greater when the client platform is an enhanced or interactive television device than when the client platform is a conventional PC-based browser. The number of states at which a transaction could be deferred would typically grow along with the number of pages of forms in the transaction.

FIG. 3 also depicts a deferred state 3500 entered through a deferral transition 3600. For instance, if the second state 3200 were the second page of the MUTA, the user could elect to defer completion of the MUTA and transition from the second state 3200 to the deferred state 3500 with the deferral transition 3600. Once deferred, the MUTA remains in the deferred state 3500 until the user decides to complete it. When the user decided to complete it, a resumption transition into the second state 3720 would return the MUTA to the second state 3200— the position from which the user entered the deferred state 3500. FIG. 3 illustrates this with a parenthetical notation of the resumption transition given the position at deferral, e.g. (R|P=2) for "Resume given that position at deferral was state 2". The user could then proceed to complete the MUTA from the second state 3200. FIG. 3 also shows a resumption transition into the third state 3730 and a resumption transition into the Nth state 3740 indicating that the features of the invention provide for deferral and resumption from any state of the MUTA.

Figure 4:
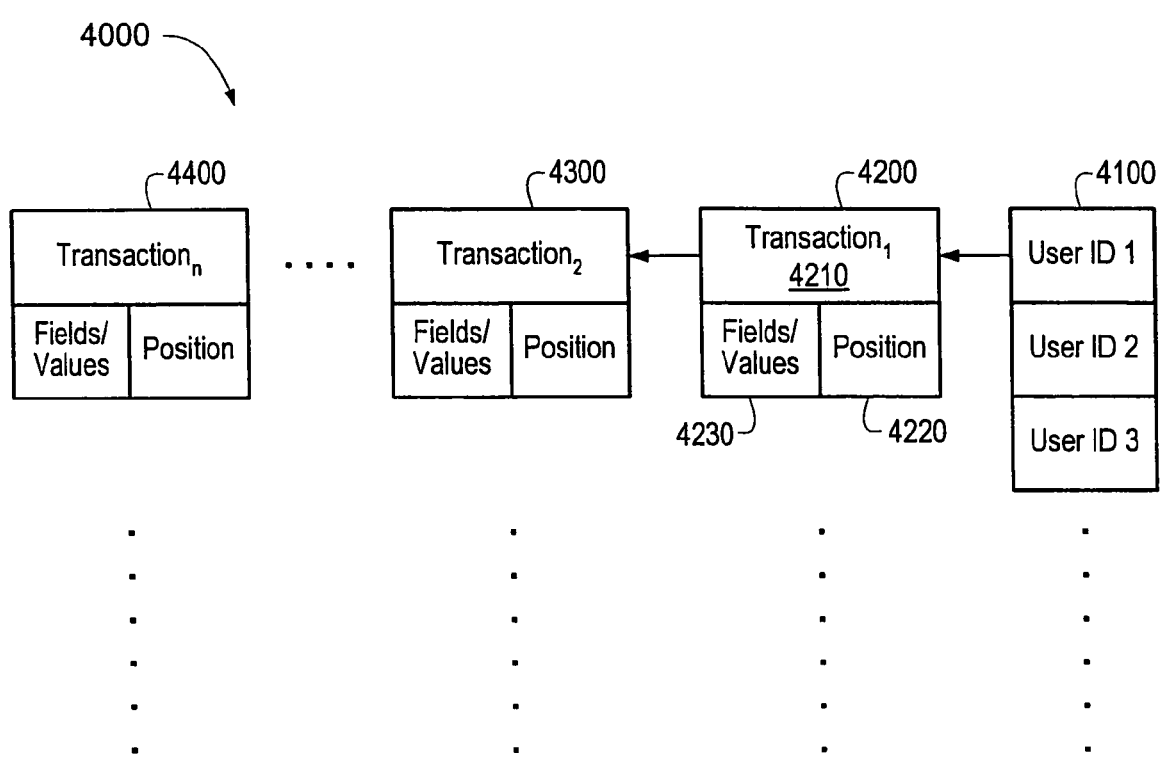
FIG. 4 is a diagram of a completion deferral data architecture in accordance with an illustrative embodiment.

FIG. 4 depicts an data architecture 4000 in accordance with an illustrative embodiment. In this illustrative embodiment, the server process 1300 configures the memory 2020 of the computer system 2000 to provide the data structure 2040 in accordance with the data architecture 4000 for deferral and resumption of MUTAs. In other embodiments, information stored in the data architecture 4000 could be stored in the mass data storage 2080 and maintained with a conventional database management system. The data architecture 4000 comprises, for instance a table or tree, keyed by a user identifier 4100. The user identifier 4100 could be an identifier of a user associated generally with an account maintained by an operator of the server process 1300, could be established on a per-transaction basis, could be a more general form of personal identification information such as a PIN number, or other identifier. FIG. 4 also depicts a first transaction state object 4200 comprising a transaction identifier 4210, a position identifier 4220, and a set of field/value pairs 4230. State objects such as the first transaction state object 4200 are created in accordance with the illustrative embodiment when deferred completion of the MUTA is elected by the user.

The transaction identifier 4210 is an identifier of a particular transaction for which deferred completion has been elected. A user may defer completion of plural transactions, as illustrated by a second transaction state object 4300 and a Nth transaction state object 4400. The transaction identifier 4210 in the first transaction state object 4200 distinguishes the transaction associated with the first transaction state object 4200 from those associated with the second transaction state object 4300 or the Nth transaction state object 4400.

The position identifier 4220 in the first transaction state object 4200 identifies a position in the flow of steps the MUTA comprises to which the user should be returned when resuming the MUTA. The position could be the position at which the user elected deferred completion; the position could also be context-sensitive and, for instance, return the user to a contextually-appropriate prior step. When, for instance, the MUTA is implemented through one or more text markup language documents, e.g. HTML pages, the first transaction state object 4200 may conveniently be a URI.

The set of field/value pairs 4230 in the first transaction state object 4200 stores data fields and associated data field values relevant to completion of the MUTA that have been made available up to the point at which completion deferral was elected. This may include, for instance, user data input as part of the MUTA, data from the user from previous transactions, data obtained from other sources, e.g., user profile information, accounting information internal to the operator of the server process 1300, etc.

In some embodiments, the MUTA is implemented as a plurality of text markup language documents, possibly including dynamic contents through server-side scripts or programs, and/or client-side scripts or programs. One illustrative embodiment implements the MUTA as a plurality of JavaServer Pages which dynamically produce HTML-based or JavaScript/ECMAScript-based forms for rendering by the client application 1100.

FIG. 5 depicts a rendered screen display of a step in the MUTA in accordance with this illustrative embodiment. The HTML or JavaScript/ECMAScript forms provide resources for the input of information related to completion of the MUTA. The forms may be rendered by the client application 1100 as illustrated by a first form field 5100, a second form field 5200, and a third form field 5300 in FIG. 5. In addition, a resource for selection of a deferral action is shown by a 'defer' button 5400. The resource for selection of a deferral action may also be implemented in HTML, a scripting language, or using other Internet programming techniques known in the art. The particular manner of implementation is not fundamental.

Again making reference, to FIG. 3, the MUTA can be considered to be in, for instance the second state 3200, when the rendered display of FIG. 5 is being presented to the user. If the user were to select the deferral action by using a selection device to select the 'defer' button 5400, the deferral transition 3600 would be followed to enter the deferred state 3500.

Figure 6:
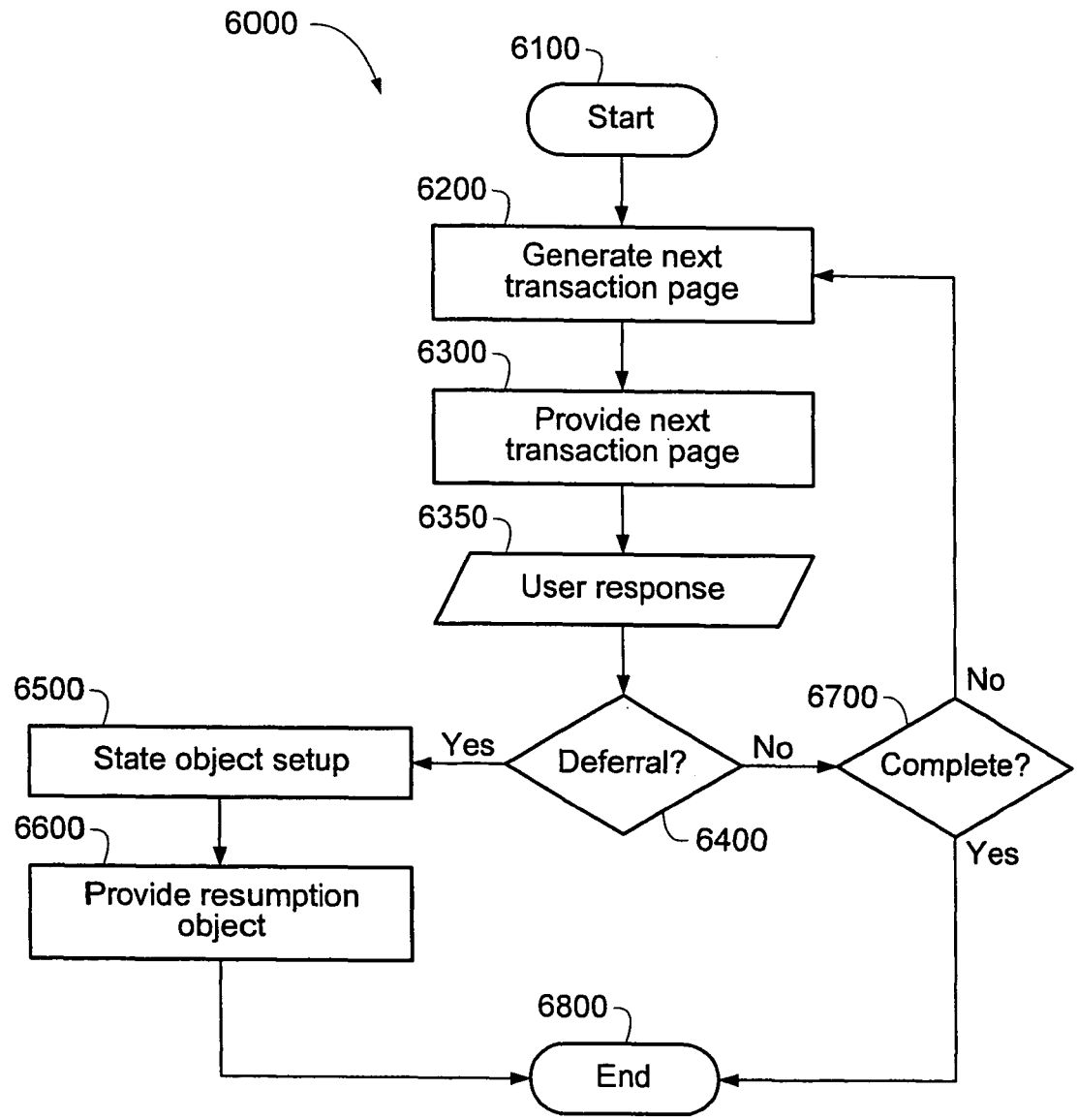
FIG. 6 depicts a flow diagram of a method for deferring completion of a MUTA in accordance with an illustrative embodiment.

To further illustrate features of deferred completion of MUTAs, reference can be made to FIG. 6 where a flow diagram of a 'deferred completion' method 6000 in accordance with an illustrative embodiment is shown. The 'deferred completion' method 6000 may be carried out by the server process 1300 when engaging in client server communications with the client application 1100. As depicted in FIG. 6, the 'deferred completion' method 6000 is shown initiating at an intermediate point in a MUTA. As one of skill in the art will appreciate, the particular steps which come before the 'deferred completion' method 6000 in the MUTA are not fundamental and the completion deferral features illustrated by the 'deferred completion' method. 6000 could be added to conventional transacting systems.

Process flow initiates at a 'start' terminal 6100 and continues to a 'generate next transaction page' process 6200. The 'generate next transaction page' process 6200 involves the server process 1300 creating the next in a series of pages implementing the information flow of the MUTA. This may occur in any conventional manner. In preferred versions of the invention, a server-side programming architecture, such as JavaServer Pages, is used and pages with application logic interact with the server process 1300 to create the contents of the next page dynamically.

Process flow continues to a 'provide next transaction page' process 6300 in which the server process 1300 transmits the next page from the 'generate next transaction page' process 6200 to the client application 1100. The client application 1100 parses and renders the next page and awaits user interaction. As noted in connection with FIG. 5, the user may enter data in form fields or interact with information interchange aspects of the MUTA. In addition, the user may elect deferred completion of the MUTA. The user then responds to the next page; the server process 1300 receives a 'user response' data block 6350, and process flow continues to a 'deferral' decision process 6400.

The 'deferral' decision process 6400 examines the 'user response' data block 6350 to determine if the user has elected deferred completion. If so, process flow continues to an 'state object setup' process 6500 which creates a state object similar to, for instance the first transaction state object 4200. The 'state object setup' process 6500 then stores in the state object a transaction identifier, data fields and values necessary for completion of the MUTA, and an identifier of the current position in the MUTA. The data fields and values stored in the state object preferably comprise all data fields and values necessary to complete the MUTA that have been entered by the user up to this point. In addition if sufficient values for data fields that are necessary to complete the MUTA are available without user input, for instance from a record of a previous interaction, these data fields and values are also stored in the state object.

Process flow continues to a 'provide resumption object' process 6600 that creates and provides to the user an object that will allow the user to resume the MUTA they have deferred. In some embodiments, the resumption object is a URI that identifies a resumption resource. When a request is made to the resumption resource, the data fields and values stored in the state objected would be retrieved and the request is redirected to the position stored in the state object. One skilled in the art will appreciate many other similar implementations where the redirection is to a URI functionally equivalent as to the position stored in the state object. In some embodiments, the URI that identifies the resumption resource could be emailed to the user.

In other embodiments, the. resumption resource is the resource referenced by the position stored in the state object. In these embodiments, the resumption object could then be the resumption resource. The resumption object could be provided to the user through email or other messaging system.

In still other embodiments, the server process 1300 could be configured to provide a page showing a list of the transactions the user has deferred and a resumption resource for each of the list of transactions. The resumption object could be a URI that is emailed to the user that would provide the page when the user's client application requested the URI. In a variation, the server. process could generate the page and the page could be emailed to the user.

Numerous other variations will be apparent to one skilled in the art that are within the scope and spirit of the invention. From the 'provide resumption object' process 6600, process flow completes through an 'end' terminal 6800

If the user does not elect to defer completion, the 'deferral' decision process 6400 exits through its 'no' branch and process flow continues to a 'complete' decision process 6700 that determines if steps remain in the MUTA. If so, the 'complete' decision process 6700 exits through its 'yes' branch and process flow returns to the 'generate next transaction page' process 6200 for another iteration.

When no steps remain in the MUTA, the 'complete' decision process 6700 exits through its 'yes' branch and process flow completes through the 'end' terminal 6800.

As described with reference to FIG. 5 and FIG. 6, when the user selects to defer completion through a selectable deferral action resource, for instance the 'defer' button 5400, a state object was created to store the state of the MUTA so the user could later complete it. In other variations, a state object is maintained throughout the MUTA so that that user need not affirmatively elect to defer completion. Rather, if the user simply fails to complete the MUTA for any reason, it may be completed by resuming at a later time.

Figure 7:
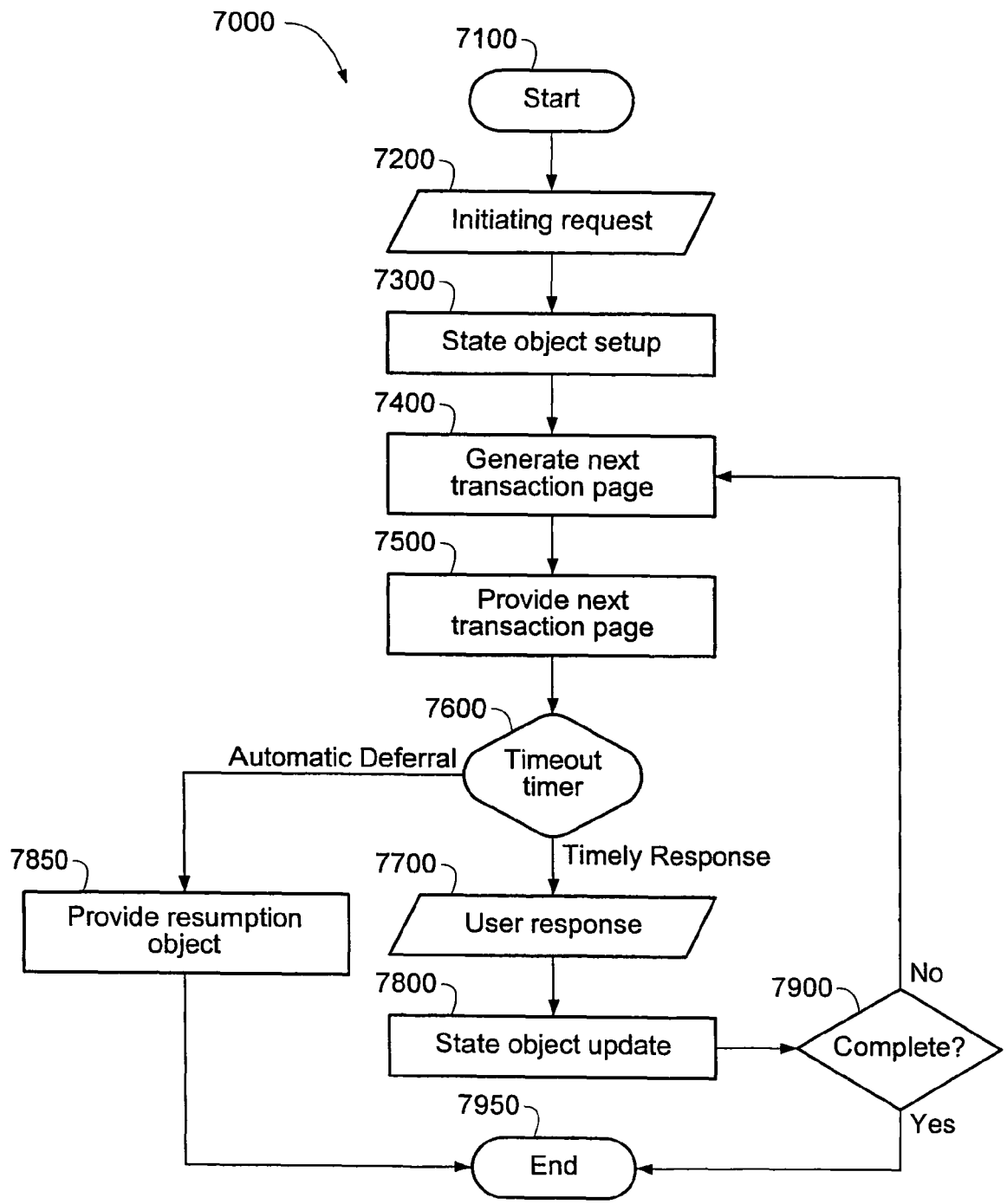
FIG. 7 depicts a flow diagram of a method for deferring completion of a MUTA with automatic state saving in accordance with an illustrative embodiment.

FIG. 7 depicts a flow diagram of a 'deferred completion with automatic state saving' method 7000 in accordance with an illustrative embodiment. In FIG. 7 initial steps of a MUTA (which were omitted in FIG. 6) are shown. Process flow initiates at a 'start' terminal 7100 and continues when the server process 1300 receives an 'initiating request' data block 7200 from the client application 1100 of a user. The 'initiating request' data block 7200 in preferred embodiments is an HTTP Request Message for a resource which initiates a MUTA.

Process flow continues to a 'state object setup' process 7300 that creates a state object such as the first transaction state object 4200 and sets a transaction identifier, a position identifier, and any data field/value pairs that may be available. Processing continues to a 'generate next transaction page' process 7400 and a 'provide next transaction page' process 7500 that executes analogously to the corresponding processes described in connection with FIG. 6.

Next, a timeout timer 7600 executing on the server process 1300 awaits a response from the client application 1100. If no response arrives within a predetermined time period, the timeout timer 7600 exits through its 'automatic deferral' branch and process flow continues to a 'provide resumption object' process 7850 that executes analogously to the corresponding processes described in connection with FIG. 6. Process flow then completes through an 'end' terminal 7950. In some embodiments, the timeout timer 7600 (or other process) could also be configured to insure that the user's state is saved should an exceptional event force interruption of the MUTA session. For instance, should the server process 1300 crash or otherwise fail in a manner forcing interruption of the session with the client application 1100, rather than simply exit, the state of the MUTA could then be saved enabling the user to resume from that point.

If a response is received from the client application 1100 within the predetermined time period, the timeout timer 7600 exits through its 'timely response' branch and data from a 'user response' data block 7700 is processed. Next a 'state object update' process 7800 updates the state object created by the 'state object setup' process 7300: the position identifier is altered to reflect that the MUTA has advanced a step, and data received in the 'user response' data block 7700 is added to the data fields/values. Process flow continues to a 'complete' decision process 7900 that executes analogously to the corresponding processes described in connection with FIG. 6 and process flow either returns to the 'generate next transaction page' process 7400 for another iteration or completes through the 'end' terminal 7950.

Figure 8:
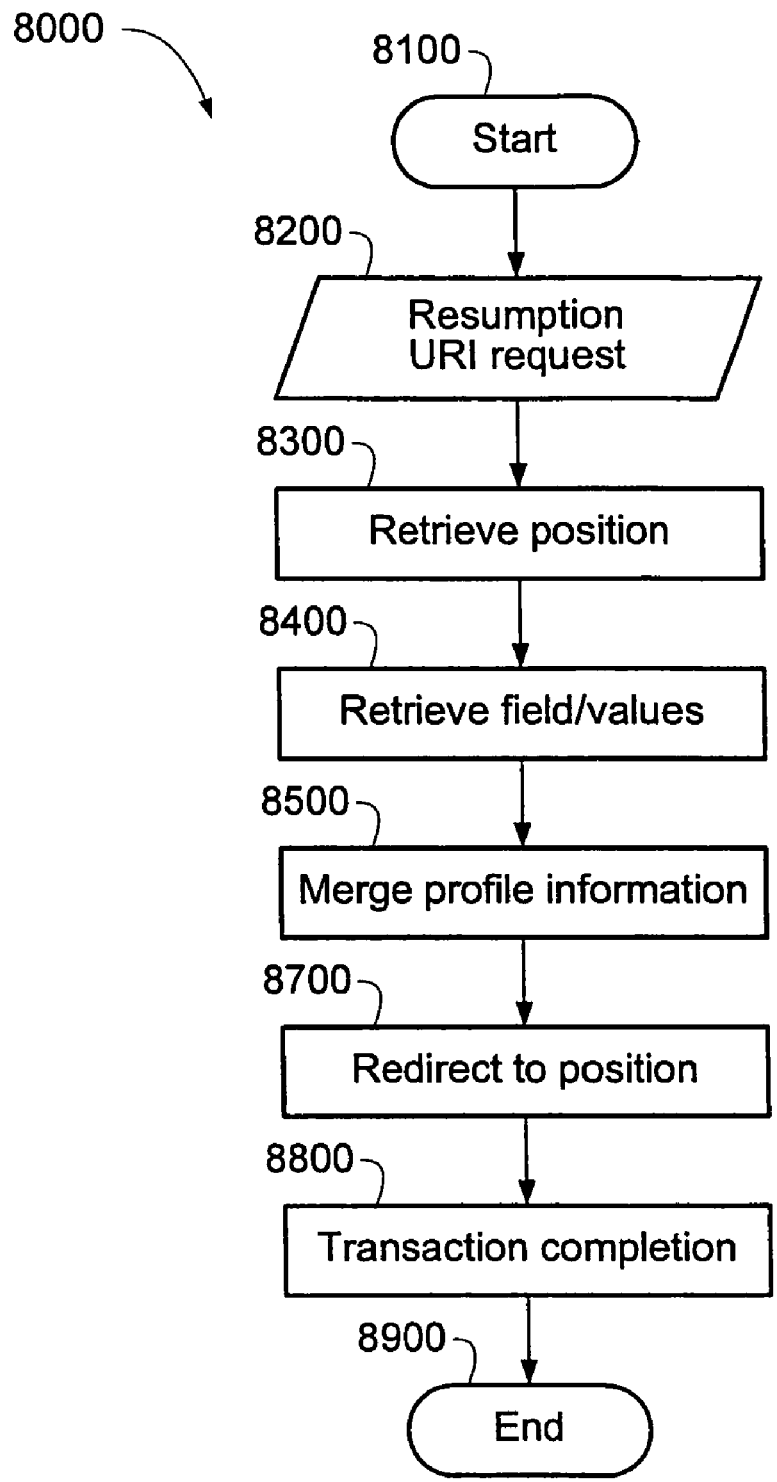
FIG. 8 depicts a flow diagram of a method for completing a previously-deferred MUTA in accordance with an illustrative embodiment.

A user should be able to resume a previously deferred MUTA to complete it. FIG. 8 depicts a flow diagram of a 'MUTA resumption' method 8000 in accordance with an illustrative embodiment. The 'MUTA resumption' method 8000 is carried out by the server process 1300. Process flow initiates at a 'start' terminal 8100 and continues to receive a 'resumption URI request' data block 8200 from the client application 1100 of the user.

As described with reference to the 'provide resumption object' process 6600, the user is provided an identifier of a resumption resource in a resumption object. In this illustrative embodiment, the resumption object comprises a resumption resource in the form of a URI in the 'resumption URI request' data block 8200. In preferred embodiments the 'resumption URI request' data block 8200 is an HTTP Request Message and the server process 1300 parses the Request Message; extracts the resumption URI; and maps the resumption URI to an internal resource used to access the state object associated with the MUTA. For instance, the mapping may be to a table lookup operation or database query depending, for instance, on the storage architecture for state objects.

Process flow continues to a 'retrieve position' process 8300 and a 'retrieve fields/values' process 8400. In the 'retrieve position' process 8-300, the server process 1300 accesses the state object and retrieves the position identifier from the state object. Similarly, in the 'retrieve fields/values' process 8400, the server process 1300 retrieves the data field/value pairs from the state object.

During the period between when a MUTA is deferred and when it is resumed, additional information required to complete the MUTA may have been entered by the user or otherwise made available to the server process 1300. The additional information could be stored in a user profile. When the user resumes the MUTA after deferral, a 'merge profile information' process 8500 examines the user profile to determine what information in the user profile could be used in completion of the remainder of the user transaction application.

Process flow continues to a 'redirect to position' process 8700 process where the server process 1300 redirects the Request Message from the 'resumption URI request' data block 8200 to the position identifier retrieved from the state object by the 'retrieve position' process 8300. Next, a 'transaction completion' process 8800 allows the user to complete the MUTA. The 'transaction completion' process 8800 may, for instance, be to return to processing such as that described above in connection with FIG. 6. Process flow completes through a 'end' terminal 8900.

Although the present invention has been described in terms of features illustrative embodiments, one skilled in the art will understand that various modifications and alterations may be made without departing from the scope of the invention. Accordingly, the scope of the invention is not to be limited to the particular embodiments discussed herein, but should be defined only by the allowed claims and equivalents thereof.

What is claimed is:

1. A method, comprising:
   a computer system causing a first display in a client application of a page used in a multi-page transaction, wherein the page includes two or more data fields;
   the computer system receiving input from a user of the client application for the two or more data fields;
   the computer system causing storage of state information indicating that input for the two or more data fields has been received;
   in response to the computer system determining, subsequent to receiving the input from the user, that no response from the client application for the multi-page transaction has been received within a predetermined time period, the computer system causing a message including an identifier that identifies a resource enabling retrieval of the state information to be sent to the user, wherein the identifier includes an internet address that is usable to locate the stored state information; and in response to receiving an indication to resume the multi-page transaction, wherein the indication includes the identifier, the computer system resuming the multi-page transaction without requiring re-entry of the input for the two or more data fields.

2. The method of claim 1, wherein the computer system causes a second display in the client application of a second page used in the multi-page transaction prior to said determining.

3. The method of claim 1, wherein the page allows a user to select deferring completion of the multi-page transaction.

4. The method of claim 1,
wherein the state information is stored in a state object on the computer system.

5. The method of claim 1, wherein the message sent to the user is an e-mail.

6. The method of claim 1, further comprising the computer system, subsequent to said resuming the multi-page transaction:
receiving additional user input for the multi-page transaction;
causing storage of updated state information indicative of the additional received user input;
causing a second message including an identifier enabling retrieval of the updated state information to be sent to the user; and
resuming the multi-page transaction without requiring re-entry of the additional received input.

7. The method of claim 1,
wherein the multi-page transaction comprises a plurality of web pages viewable in a browser application.

8. A computer-readable storage medium having instructions stored thereon that are executable to cause a computing device to perform operations comprising:
causing a display in a client application of a page used in a multi-page transaction, wherein the page includes two or more data fields;
receiving input from a user of the client application for the two or more data fields;
causing storage of state information indicating that input for the two or more data fields has been received;
in response to determining, subsequent to receiving the input from the user, that no response from the client application for the multi-page transaction has been received within a predetermined time period, sending a message including an identifier that identifies a resource enabling retrieval of the state information, wherein the identifier includes an internet address that is usable to locate the stored state information; and
in response to receiving an indication to resume the multi-page transaction, wherein the indication includes the identifier, resuming the multi-page transaction without requiring re-entry of the input for the two or more data fields.

9. The computer-readable storage medium of claim 8, further including instructions executable to cause the computing device to perform operations comprising:
causing a second display in the client application of a second page used in the multi-page transaction prior to said determining.

10. The computer-readable storage medium of claim 8, wherein the page is a web page that includes script code as part of the multi-page transaction application.

11. The computer-readable storage medium of claim 8, wherein the state information is stored in a state object.

12. The computer-readable storage medium of claim 8, wherein the message is included in a page showing one or more transactions not yet completed for the user.

13. The computer-readable storage medium of claim 8, wherein the operations further comprise merging additional information into the stored state information prior to resuming the multi-page transaction.

14. The computer-readable storage medium of claim 8, wherein the operations further comprise causing a display of a page including a list of deferred multi-page transactions, wherein individual ones of the list of multi-page transactions are selectable for resumption.

15. A system comprising:
at least one processor;
at least one memory coupled to the at least one processor, wherein the at least one memory stores program instructions executable by the at least one processor to cause the system to perform the following:
causing a display in a client application of a page that is part of a first multi-page transaction, wherein the page includes two or more data fields;
receiving user input for the two or more data fields;
causing storage of state information indicating that the user input has been received;
in response to determining, subsequent to receiving the user input, that no response for the multi-page transaction has been received from the client application within a predetermined time period, sending a message including an identifier that identifies a resource enabling retrieval of the state information, wherein the identifier includes a network address that is usable to locate the stored state information; and
in response to receiving an indication to resume the first multi-page transaction that includes the identifier, resuming the first multi-page transaction without requiring re-entry of the input for the two or more data fields.

16. The system of claim 15, wherein the at least one memory stores further program instructions executable by the at least one processor to cause the system to perform causing a second display in the client application of a second page used in the multi-page transaction prior to said determining.

17. The system of claim 15,
wherein the page is provided by the system and allows a user of the client application to manually defer completion of the first multi-page transaction.

18. The system of claim 15,
wherein the state information includes a position identifier for the first multi-page transaction.

19. The system of claim 15, wherein the at least one memory stores further program instructions executable by the at least one processor to cause display of a page including a list of a plurality of deferred multi-page transactions, wherein the list includes the first multi-page transaction.

20. The system of claim 15, wherein the causing storage of the state information comprises causing storage of the state information in a database.

21. The method of claim 1, further comprising the computer system causing a display of a page including a list of deferred multi-page transactions, wherein individual ones of the list of multi-page transactions are selectable for resumption.

* * * * *

UNITED STATES PATENT AND TRADEMARK OFFICE
CERTIFICATE OF CORRECTION

| | | |
|---|---|---|
| PATENT NO. | : 8,171,490 B2 | Page 1 of 1 |
| APPLICATION NO. | : 11/264456 | |
| DATED | : May 1, 2012 | |
| INVENTOR(S) | : Weber et al. | |

It is certified that error appears in the above-identified patent and that said Letters Patent is hereby corrected as shown below:

On the Face Page, in Field (57), under "ABSTRACT", in Column 2, Line 12, delete "use may" and insert -- user may --, therefor.

On Page 2, in Field (56), under "OTHER PUBLICATIONS", in Column 1, Line 7, delete "man2ntml" and insert -- man2html --, therefor.

In Column 1, Line 12, delete heading "RELATED APPLICATION" and insert the same at Line 5.

In Column 3, Line 22, delete "inclde" and insert -- include --, therefor.

In Column 8, Line 45, delete "the." and insert -- the --, therefor.

In Column 8, Line 57, delete "server." and insert -- server --, therefor.

In Column 8, Line 62, delete "6800" and insert -- 6800. --, therefor.

In Column 10, Line 20, delete "8-300," and insert -- 8300, --, therefor.

Signed and Sealed this
Eighteenth Day of September, 2012

David J. Kappos
*Director of the United States Patent and Trademark Office*